(12) United States Patent
Li et al.

(10) Patent No.: US 9,705,912 B2
(45) Date of Patent: Jul. 11, 2017

(54) DEVICE, SYSTEM AND METHOD FOR PROCESSING VIRUS FILES

(71) Applicant: TENCENT TECHNOLOGY (SHENZHEN) COMPANY LIMITED, Shenzhen (CN)

(72) Inventors: Linfeng Li, Shenzhen (CN); Ling Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 239 days.

(21) Appl. No.: 14/693,936

(22) Filed: Apr. 23, 2015

(65) Prior Publication Data

US 2015/0229653 A1 Aug. 13, 2015

Related U.S. Application Data

(63) Continuation of application No. PCT/CN2013/085655, filed on Oct. 22, 2013.

(30) Foreign Application Priority Data

Oct. 29, 2012 (CN) .......................... 2012 1 0420904

(51) Int. Cl.
*H04L 29/06* (2006.01)
*G06F 21/56* (2013.01)
*H04L 29/08* (2006.01)

(52) U.S. Cl.
CPC .......... *H04L 63/145* (2013.01); *G06F 21/566* (2013.01); *H04L 63/1408* (2013.01); *H04L 67/10* (2013.01)

(58) Field of Classification Search
USPC ........................................................ 726/24
See application file for complete search history.

(56) References Cited

U.S. PATENT DOCUMENTS

| 6,507,904 B1 * | 1/2003 | Ellison | G06F 21/53 711/152 |
| 7,293,177 B2 | 11/2007 | Lahti et al. | |
| 2007/0094539 A1 * | 4/2007 | Nakatsuka | H04L 63/145 714/38.1 |

FOREIGN PATENT DOCUMENTS

| CN | 101064878 | 10/2007 |
| CN | 101382984 | 3/2009 |
| CN | 102012982 A | 4/2011 |

OTHER PUBLICATIONS

Office Action in CN Application No. 201210420904.0 dated Mar. 4, 2016, 8 pages.

(Continued)

*Primary Examiner* — Brandon Hoffman
*Assistant Examiner* — Samuel Ambaye
(74) *Attorney, Agent, or Firm* — Marshall, Gerstein & Borun LLP (57) ABSTRACT

A device for processing a virus file, including a memory, and a processor in communication with the memory, the memory stores a virus file information providing instruction, a cleaning instruction, an isolating instruction and a transferring instruction, which are executable by the processor; the virus file information providing instruction indicates to provide virus file information; the cleaning instruction indicates to clean a virus file in a User Equipment (UE) corresponding to the virus file information, based on the virus file information; the isolating instruction indicates to provide isolation space, and utilize the isolation space to isolate the virus file, and the transferring instruction indicates to transfer the virus file, which is cleaned based on the cleaning instruction, to the isolation space.

12 Claims, 10 Drawing Sheets

(56) References Cited

OTHER PUBLICATIONS

International Preliminary Report on Patentability in International Application No. PCT/CN2013/085655 dated May 5, 2015, 7 pages.
Search Report in International Application No. PCT/CN2013/085655 dated Jan. 30, 2014.

* cited by examiner

DEVICE, SYSTEM AND METHOD FOR PROCESSING VIRUS FILES

This application is a continuation of Application No. PCT/CN2013/085655, filed on Oct. 22, 2013. This application claims the benefit and priority to of Chinese Patent Application No. 201210420904.0, entitled "System and Method for Processing Virus Files" and filed on Oct. 29, 2012. The entire disclosures of each of the above applications contents of all of which are incorporated herein by reference in their entirety for all purposes.

TECHNICAL FIELD

The present disclosure relates to security software technologies, and more particularly, to a device, system and method for processing virus files.

BACKGROUND

At present, security software is generally installed on a User Equipment (UE), such as a computer, a mobile terminal. The security software refers to a program tool, which may remove all of the known programs codes, e.g., virus, Trojan, hazardous to a UE, such as a computer or a mobile terminal.

SUMMARY

Examples of the present disclosure provide a device, system and method for processing virus files, such that virus files in a UE may be searched out in a targeted manner, a risk of the UE being destroyed by virus files may be reduced, and computer resources of the UE, which may be occupied and consumed by the operation of searching for virus files, may also be reduced. In addition, other files may be prevented from being infected by the virus files, after the virus files having been cleaned.

A device for processing a virus file, including a memory, and a processor in communication with the memory, wherein the memory stores a virus file information providing instruction, a cleaning instruction, an isolating instruction and a transferring instruction, which are executable by the processor, the virus file information providing instruction indicates to provide virus file information;

the cleaning instruction indicates to clean a virus file in a User Equipment (UE) corresponding to the virus file information, based on the virus file information;

the isolating instruction indicates to provide isolation space, and utilize the isolation space to isolate the virus file, and the transferring instruction indicates to transfer the virus file, which is cleaned based on the cleaning instruction, to the isolation space.

A system for processing a virus file, including a server and a client, in which the server includes a first memory, a first processor in communication with the first memory, and a first interface, the first memory stores a virus file information providing instruction executable by the first processor, the virus file information providing instruction indicates to provide virus file information for the client via the first interface, in which the client includes a second memory, a second processor in communication with the second memory, and a second interface, the second interface is to receive the virus file information from the server, and transmit the received virus file information to the second memory to be stored, the second memory further stores a cleaning instruction, an isolating instruction and a transferring instruction, which are executable by the second processor, the cleaning instruction indicates to clean a virus file in a User Equipment (UE) corresponding to the virus file information, based on the virus file information;

the isolating instruction indicates to provide isolation space, and utilize the isolation space to isolate the virus file; and the transferring instruction indicates to transfer the virus file, which is cleaned based on the cleaning instruction, to the isolation space.

A method for processing a virus file, including:

providing virus file information;

based on the virus file information, cleaning the virus file in a User Equipment (UE) corresponding to the virus file information;

providing isolation space and utilizing the isolation space to isolate the virus file, and transferring the cleaned virus file to the isolation space.

In the examples of the present disclosure, operations about searching for virus files are targeted and purposeful. The reason is as follows. The operations about searching for virus files are executed, by utilizing the collected virus file information. The collected virus file information may indicate files in which path (directory) in a UE may hide virus files, types of virus files, and so on. Thus, based on the technical solutions of the present disclosure, virus files in a UE may be searching for in a targeted manner, and a risk of the UE being destroyed by virus files may be reduced. In addition, in the present disclosure, since searching for a virus file by utilizing virus file information, it is not necessary to full scan a UE. Subsequently, computer resources of the UE, which are occupied and consumed by the operations of searching for virus files, may be reduced. Furthermore, other files may be prevented from being infected by virus files, after the virus files having been cleaned. In the present disclosure, since monitoring whether a UE is idle, the operations of searching for virus files may be flexible. The reason is as follows. In the present disclosure, virus files may be searched for when a UE is idle, instead of being searched for when the UE is busy. Thus, processing about virus files may be applicable to practical usage conditions of a UE, which may not bring interference to a user, when the user is employing the UE.

DETAILED DESCRIPTIONS

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

In accordance with an example of the present disclosure, a method for monitoring virus files in real time by security software may be as follows. A first block, by dividing part of space in memory, compare data passing the memory in a computer with signature of a virus database (including virus definitions) carried by the security software, so as to determine whether the data passing the memory is a virus. A second block, in the divided memory space, execute virtually a program submitted by a system or user, and judge based on behavior or result.

The foregoing searching for virus files by security software is not purposeful. Thus, during the process of searching for virus files in a UE by the security software, it is necessary to consume a large number of computer resources in a UE, which may bring great inconvenience to a user when using a UE.

In addition, during the process of executing a scan task, when searching out and cleaning a virus, the security software may generally search out the same virus at the same location, when executing a security scan task once again. This is due to the fact that, the UE, such as computer or mobile terminal, has been infected by the virus once again. Since the scan task executed by security software is generally triggered manually by a user of a UE, such as computer or mobile terminal, re-infected virus has a certain chance to escape the protection of the security software. Subsequently, damages may be given to the UE, such as computer or mobile terminal.

Figure 1:
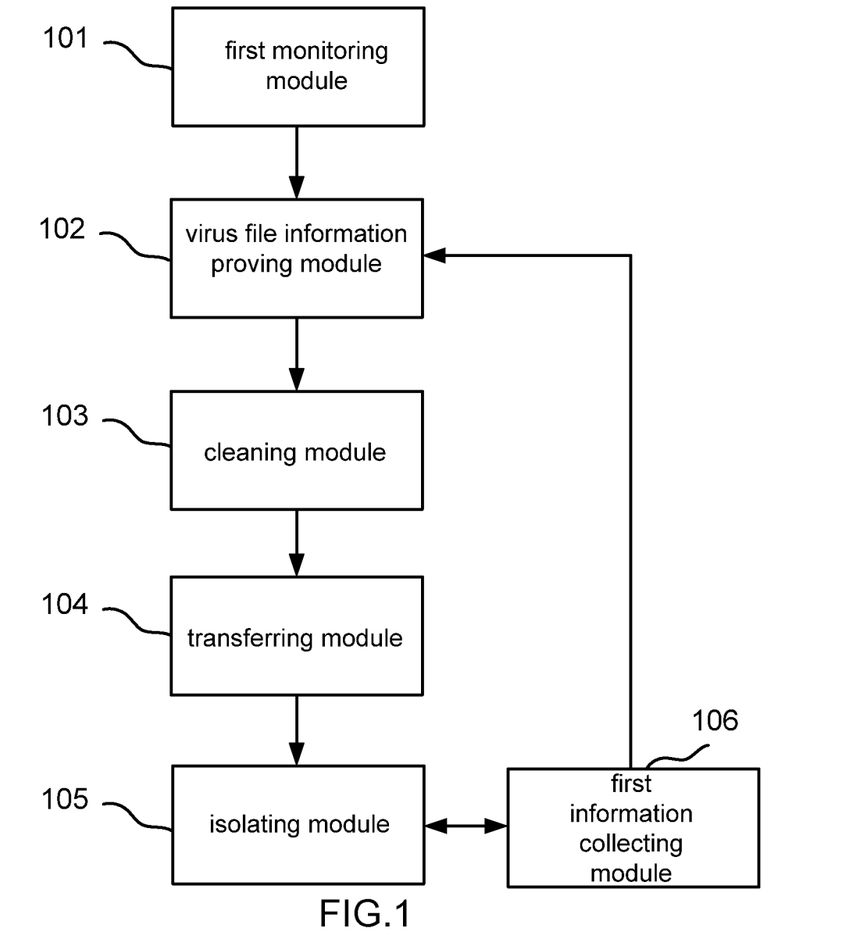
FIG. 1 is a schematic diagram illustrating structure of a device for processing virus files, in accordance with an example of the present disclosure.
Figure 2:
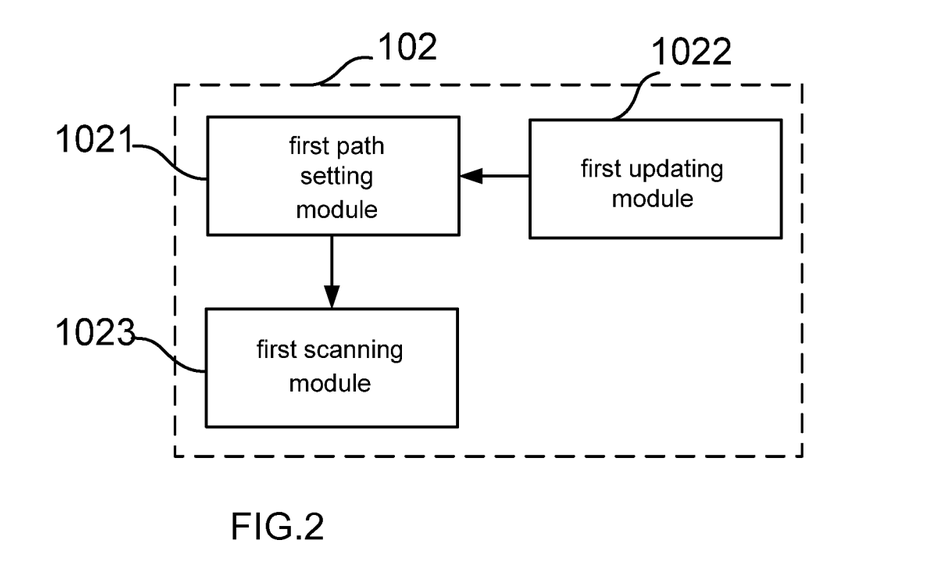
FIG. 2 is a schematic diagram illustrating structure of a virus file information providing module shown in FIG. 1, in accordance with an example of the present disclosure.

With reference to FIG. 1 and FIG. 2, FIG. 1 is a schematic diagram illustrating structure of a device for processing virus files, in accordance with an example of the present disclosure. FIG. 2 is a schematic diagram illustrating structure of a virus file information providing module 102 shown in FIG. 1, in accordance with an example of the present disclosure. In the example, the virus file processing device includes a virus file information providing module 102, a cleaning module 103, an isolating module 105 and a transferring module 104. The virus file information providing module 102 electrically connects to cleaning module 103. The transferring module 104 electrically connects to the cleaning module 103 and isolating module 105. The virus file information providing module 102 is to provide virus file information. The cleaning module 103 is to clean virus files in a UE, which correspond to the virus file information, based on the virus file information. The isolating module 105 is to provide isolation space, and isolate the virus files utilizing the isolation space. The transferring module 104 is to transfer the virus files cleaned by the cleaning module 103 to the isolation space. In the foregoing technical solution, since the isolation space used for isolating virus files is generated, the virus files searched out may be cleaned and the cleaned virus files may be transferred to the isolation space, such that the virus files may be isolated by utilizing the isolation space. Subsequently, other files in the UE may be prevented from being infected by the virus files. Thus, it may be more effective to prevent other files in the UE being infected by the virus files.

The virus file information providing module 102 may include a first path setting module 1021 and a first scanning module 1023. The first scanning module 1023 electrically connects to the first path setting module 1021 and the cleaning module 103. The first path setting module 1021 is to set a first path to be scanned in a UE. The first scanning module 1023 is to search for virus files in the UE based on the first path, and generate virus file information based on the virus files.

In the example, the virus file processing device may further include a first information collecting module 106. The first information collecting module 106 electrically connects to the isolating module 105 and the virus file information providing module 102. The first information collecting module 106 is to collect first information about virus files in the isolation space. The first information refers to information about the virus files. The first information at least includes name and path of a virus file. The first information may further include type of the virus file, and so on. In the foregoing technical solution, since virus file information in the isolation space has been collected, a corresponding file directory (path) in a UE may be scanned based on the virus file information. Subsequently, operations of searching for virus files in a UE may be executed more efficiently and more accurately.

Furthermore, the virus file information providing module 102 may further include a first updating module 1022. The first updating module 1022 electrically connects to the first path setting module 1021 and the first information collecting module 106. The first updating module 1022 is to update the first path based on the first information. The isolating module 105 is further to clean the virus files in the isolation space, after the first information collecting module 106 has obtained the first information.

In addition, to ensure that running of a UE is not influenced by the operations of searching for virus files, as an improvement, in the example, the virus file processing device may further include a first monitoring module 101. The first monitoring module 101 electrically connects to the virus file information providing module 102. The first monitoring module 101 is to monitor whether a UE is idle, and generate a first monitoring result. When the first monitoring result shows that the UE is idle, the first scanning module 1023 is further to search for virus files in the UE based on the first path, and generate the virus file information based on the virus files. The first scanning module 1023 is further to scan all of the files in the first path of the UE. In the foregoing technical solution, computer resources of a UE, which are consumed by the operations of searching for virus files, may be reduced.

In the example, the virus file processing device, which includes the virus file information providing module 102, the cleaning module 103, the isolating module 105, the transferring module 104, the first information collecting module 106 and the first monitoring module 101, may be taken as a client application and is used in a UE.

Figure 3:
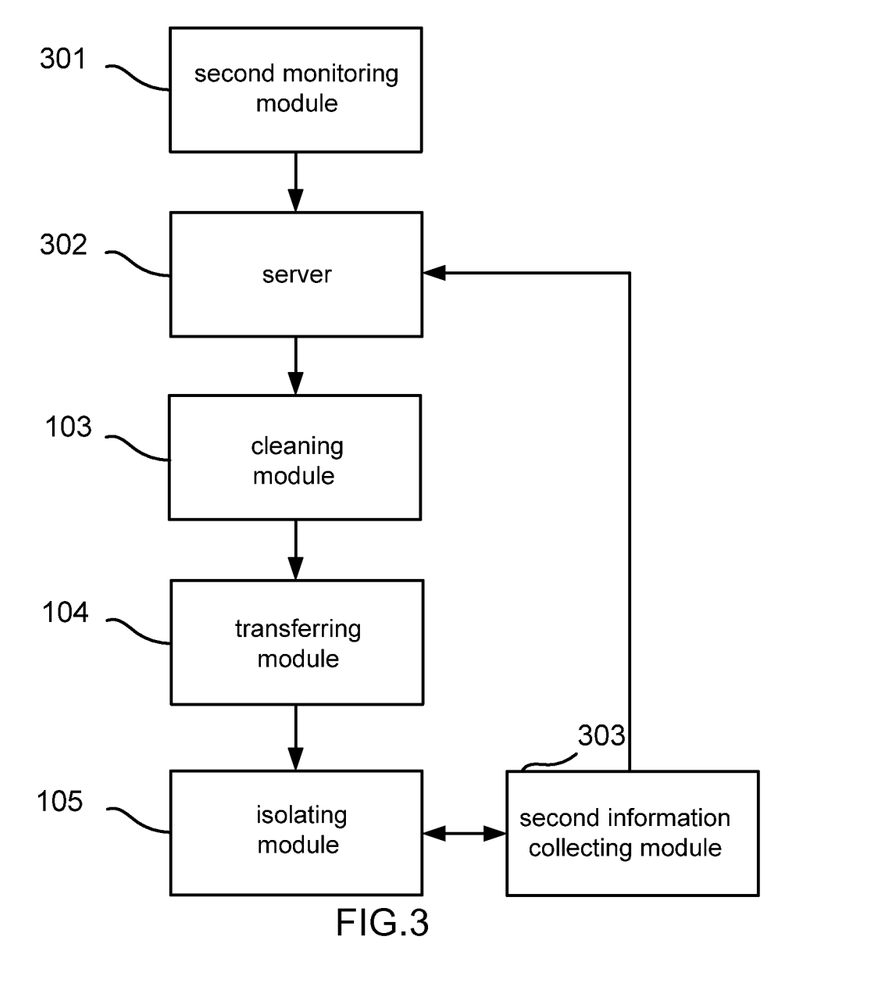
FIG. 3 is a schematic diagram illustrating structure of a system for processing virus files, in accordance with an example of the present disclosure.
Figure 4:
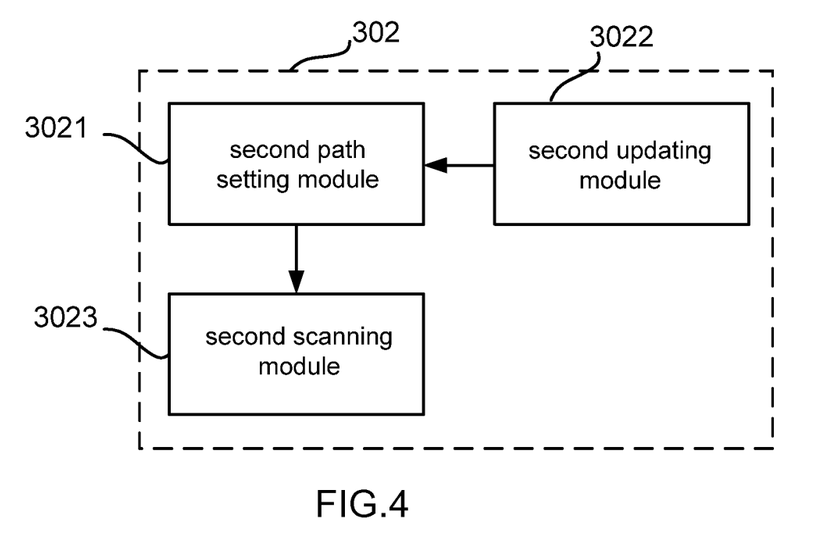
FIG. 4 is a schematic diagram illustrating structure of the server shown in FIG. 3, in accordance with an example of the present disclosure.

With reference to FIG. 3 and FIG. 4, FIG. 3 is a schematic diagram illustrating structure of a system for processing virus files, in accordance with an example of the present disclosure. FIG. 4 is a schematic diagram illustrating structure of server 302 in FIG. 3, in accordance with an example of the present disclosure.

In the example, the virus file processing system may include a server 302, a cleaning module 103, an isolating module 105 and a transferring module 104. The server 302 electrically connects to the cleaning module 103. The transferring module 104 electrically connects to the cleaning module 103 and the isolating module 105. The server 302 is to search for virus files in a UE, generate virus file information based on the virus files, and transmit the virus file information to the cleaning module 103. The cleaning module 103 is to clean virus files in a UE, which correspond to the virus file information, based on the virus file information. The isolating module 105 is to provide isolation space, and isolate the virus files by utilizing the isolation space. The transferring module 104 is to transfer the virus files, which are cleaned by the cleaning module 103, to the isolation space.

In the example, functions of server 302 are similar to that of the virus file information providing module 102 in the previous example. The server 302 may include a second path setting module 3021 and a second scanning module 3023. The second path setting module 3021 electrically connects to the second scanning module 3023. The second path setting module 3021 is to set a second path to be scanned in a UE. The second scanning module 3023 is to search for virus files in the UE based on the second path, generate virus file information based on the virus files, and transmit the virus file information to the cleaning module 103.

In the example, the virus file processing system may further include a second information collecting module 303. The second information collecting module 303 electrically connects to the isolating module 105 and the server 302. The second information collecting module 303 is to collect second information about virus files in the isolation space. The second information refers to information about the virus files. The second information at least includes name and path of a virus file. The second information may further include type of the virus file, and so on. In the foregoing technical solution, since the virus file information in the isolation space has been collected, a corresponding file directory (path) in a UE may be scanned based on the virus file information. Operations of searching for virus files in a UE may be executed more effectively and more accurately.

Furthermore, the server 302 may further include a second updating module 3022. The second updating module 3022 electrically connects to the second path setting module 3021 and the second information collecting module 303. The second updating module 3022 is to update the second path based on the second information. The isolating module 105 is further to clean the virus files in the isolation space, after the second information collecting module 303 obtaining the second information.

In addition, to enable that running of a UE is not influenced by the operations of searching for virus files, as an improvement, in the example, the virus file processing system may further include a second monitoring module 301. The second monitoring module 301 electrically connects to the server 302. The second monitoring module 301 is to monitor whether a UE is idle, and generate a second monitoring result. When the second monitoring result shows that the UE is idle, the second scanning module 3023 is further to search for virus files in the UE based on the second path, generate the virus file information based on the virus files, and transmit the virus file information to the cleaning module 103. The second scanning module 3023 is further to scan all of the files of the second path in the UE. By employing the foregoing technical solution, computer resources of UE, which are consumed by the operations of searching for virus files, may be reduced.

Figure 5:
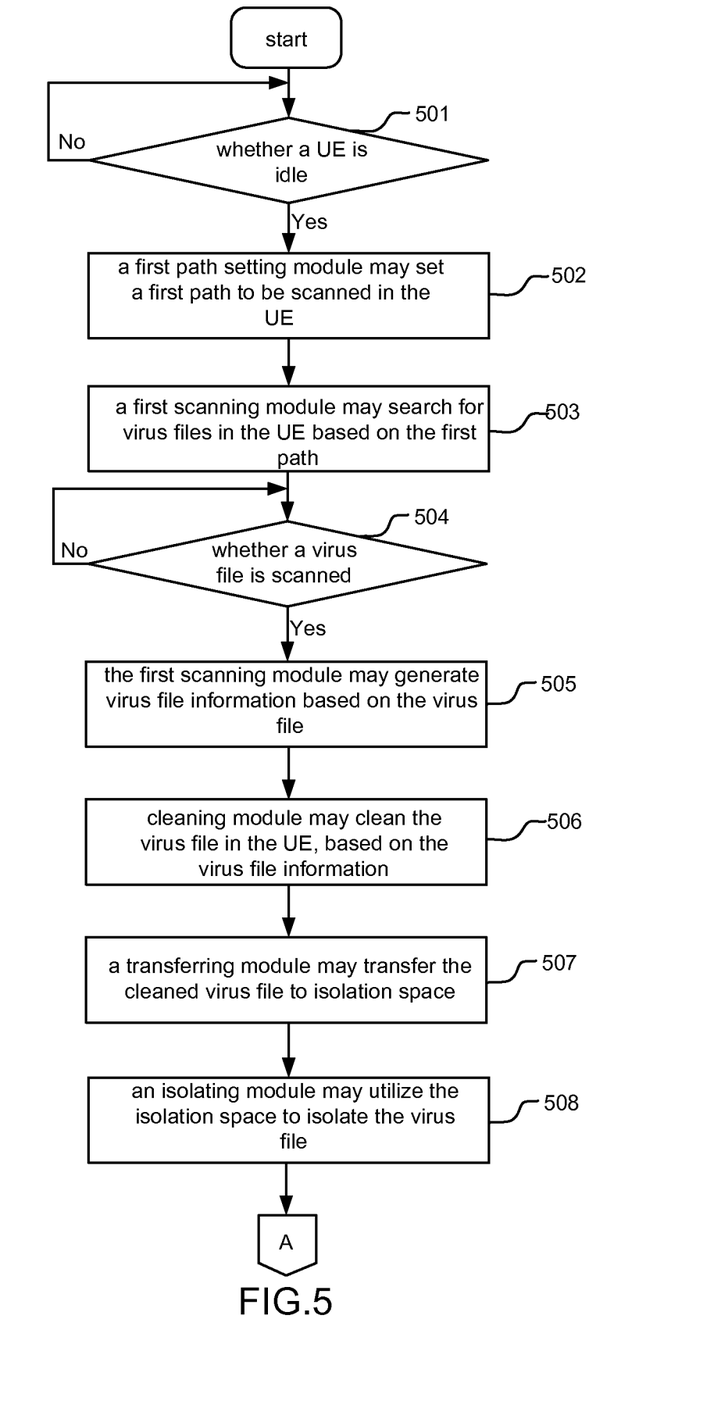
FIG. 5 and FIG. 6 are respectively a flowchart illustrating a method for processing virus files, in accordance with an example of the present disclosure.
Figure 6:
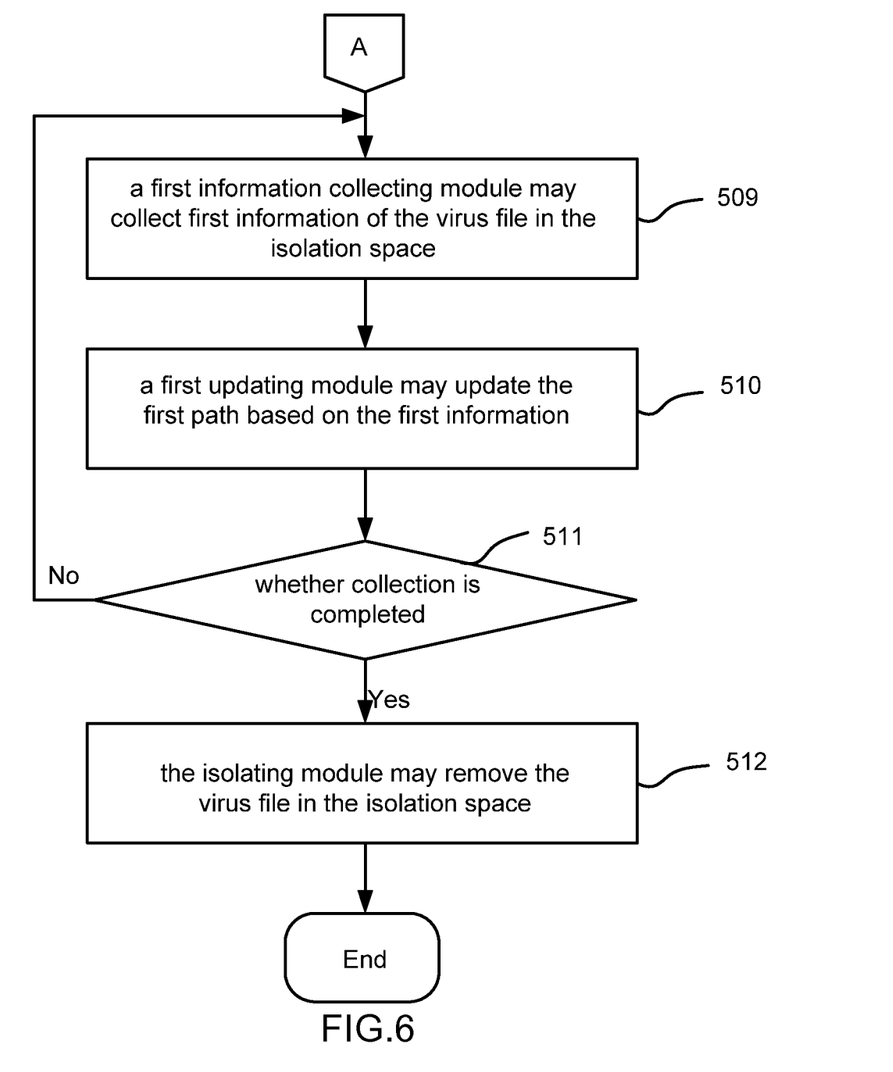

With reference to FIG. 5 and FIG. 6, FIG. 5 and FIG. 6 are respectively a flowchart illustrating a method for processing virus files, in accordance with an example of the present disclosure.

In block 501, a first monitoring module 101 is to monitor whether a UE is idle, and generate a first monitoring result. When the first monitoring result shows that the UE is idle, proceed with block 502. When the first monitoring result shows that the UE is not idle, wait and continuously monitor, until the UE is idle. The objective of monitoring the UE is to enable that, running of the UE is not influenced by the operations of searching for virus files.

In block 502 to block 505, the virus file information providing module 102 is to provide the virus file information. Specifically speaking, in block 502, a first path setting module 1021 may set a first path to be scanned in a UE. In block 503, a first scanning module 1023 may search for virus files in the UE based on the first path. Specifically speaking, when the first monitoring result shows that the UE is idle, the first scanning module 1023 may search for the virus files in the UE based on the first path. By employing the foregoing technical solution, computer resources of a UE, which are consumed by the operations of searching for virus files, may be reduced. Furthermore, the first scanning module 1023 is to scan all of the files in the first path of the UE, so as to search out all of the virus files in the folder, and prevent the omission of other virus files. In block 504, the first scanning module 1023 may determine whether a virus file has been searched out. When determining that the virus file has been searched out, proceed with block 505; otherwise, continuously scan, until all of the files in the UE have been scanned. In block 505, the first scanning module 1023 is to generate virus file information based on the scanned virus files, and indicate the cleaning module 103 to clean the virus files, based on the virus file information. The virus file information at least includes name and path of a virus file. The virus file information may further include type of the virus file.

In block 506, based on the virus file information, the cleaning module 103 may clean the virus files in the UE, which correspond to the virus file information.

In block 507, the transferring module 104 is to transfer the virus files, which are cleaned by the cleaning module 103, to the isolation space.

In block 508, the isolating module 105 is to provide isolation space, and utilize the isolation space to isolate the virus files.

In the foregoing technical solution, since the isolation space for isolating the virus files may be generated, clean the virus files searched out, and transfer the cleaned virus files to the isolation space, such that the virus files may be isolated by utilizing the isolation space, and other files in the UE may be prevented from being infected by the virus files. Thus, it may be more effectively to prevent other files in the UE being infected by the virus files.

In block 509, a first information collecting module 106 may collect first information of the virus files in the isolation space. The first information refers to information about virus files, which at least includes name and path of a virus file. The first information may further include type of the virus file, and so on. In the foregoing technical solution, since the virus file information in the isolation space has been collected, a corresponding file directory (path) in the UE may be scanned based on the virus file information. Thus, the operations of searching for virus files in the UE may be executed more effectively and more accurately.

In block 510, a first updating module 1022 may update the first path based on the first information.

In block 511, the first information collecting module 106 may determine whether information collection about the virus files in the isolation space has been completed, if yes, proceed with block 512, otherwise, continuously collect the information about the virus files in the isolation space.

In block 512, the isolating module 105 is to clean the virus files in the isolation space, after the first information collecting module 106 obtaining the first information.

Figure 7:
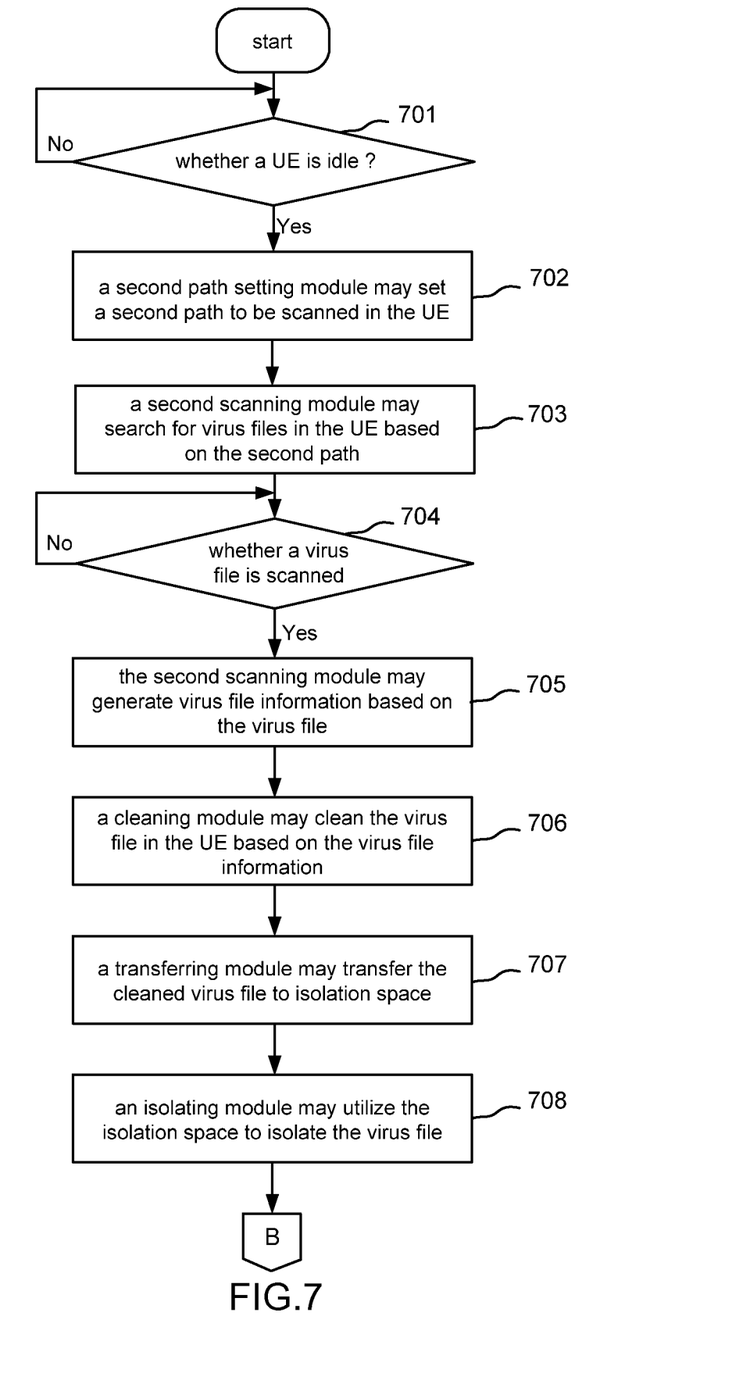
FIG. 7 and FIG. 8 are respectively a flowchart illustrating another method for processing virus files, in accordance with an example of the present disclosure.
Figure 8:
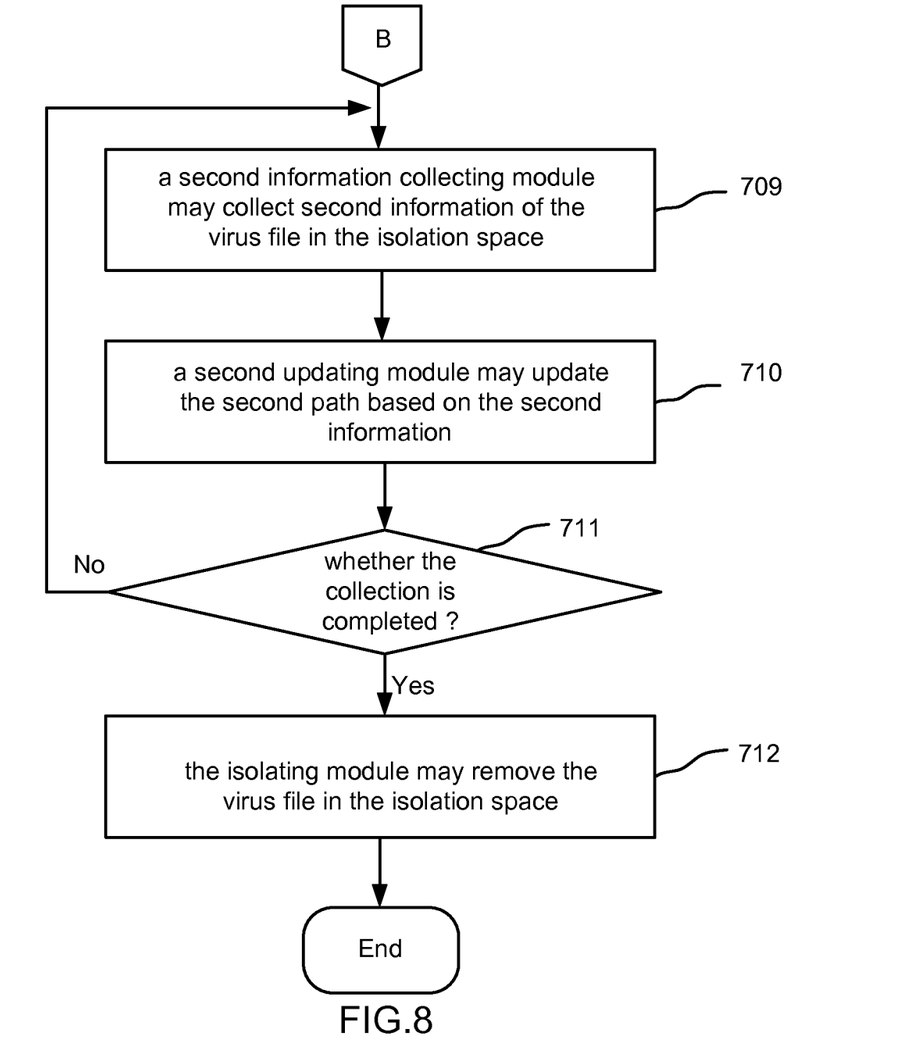

With reference to FIG. 7 and FIG. 8, FIG. 7 and FIG. 8 are respectively a flowchart illustrating another method for processing virus files, in accordance with an example of the present disclosure. In the example, the virus file processing method may be executed by the virus file processing system, while in the example the virus file processing system may include a server and a client. The server 302 of the virus file processing system may include a second path setting module 3021, a second updating module 3022 and a second scanning module 3023. The client of the virus file processing system may include a cleaning module 103, a transferring module 104, an isolating module 105, a second information collecting module 303 and a second monitoring module 301. The client may communicate with the server 302 via a network. Functions of the server 302 may be similar to that of the virus file information providing module 102 in the previous example.

In block 701, the second monitoring module 301 is to monitor whether a UE is idle, and generate a second monitoring result. When the second monitoring result shows that the UE is idle, proceed with block 702. When the second monitoring result shows that the UE is not idle, wait and continuously monitor, until the UE is idle. The objective of monitoring a UE is to enable that, running of the UE is not influenced by the operations of searching for virus files.

In block 702, the second path setting module 3021 sets a second path to be scanned in the UE.

In block 703, the second scanning module 3023 may search for the virus files in the UE based on the second path, generate virus file information based on the virus files, and transmit the virus file information to the cleaning module 103. Specifically speaking, when the second monitoring result shows that the UE is idle, the second scanning module 3023 may search for the virus files in the UE based on the second path, generate virus file information based on the virus files, and transmit the virus file information to the cleaning module 103. Furthermore, the second scanning module 3023 may scan all of the files in the second path of the UE. By employing the foregoing technical solution, computer resources of UE, which are consumed by the operations of searching for virus files, may be reduced.

In block 704, the second scanning module 3023 may determine whether a virus file has been searched out, if yes, proceed with block 705; otherwise, continuously scan, until all of the files in the UE have been scanned.

In block 705, the second scanning module 3023 may generate the virus file information based on the scanned virus files, and transmit the virus file information to the cleaning module 103.

In block 706, the cleaning module 103 may clean the virus files in the UE, which correspond to the virus file information, based on the virus file information.

In block 707, the transferring module 104 may transfer the virus files, which are cleaned by the cleaning module 103, to the isolation space.

In block 708, the isolating module 105 may provide the isolation space, and utilize the isolation space to isolate the virus files.

In block 709, the second information collecting module 303 may collect second information about the virus files in the isolation space. The second information refers to information about the virus files, which at least includes name and path of a virus file. The second information may further include type of the virus file, and so on. In the foregoing technical solution, since the virus file information in the isolation space has been collected, a corresponding file directory (path) in a UE may be scanned based on the virus file information. Subsequently, operations of searching for virus files in the UE may be executed more effectively and more accurately.

In block 710, the second updating module 3022 may update the second path, based on the second information.

In block 711, the second information collecting module 303 may determine whether collection about the virus file information in the isolation space has been completed, if yes, proceed with block 712; otherwise, continuously collect the virus file information.

In block 712, after the second information collecting module 303 obtains the second information, the isolating module 105 may remove the virus files in the isolation space.

Figure 9:
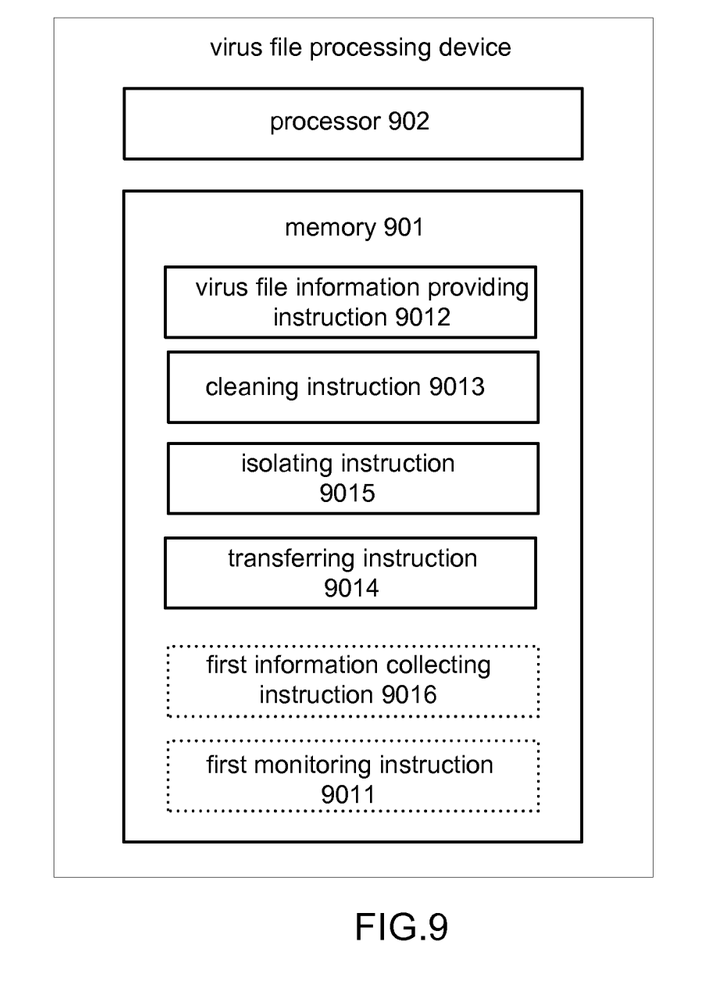
FIG. 9 is a schematic diagram illustrating structure of another device for processing virus files, in accordance with an example of the present disclosure.

FIG. 9 is a schematic diagram illustrating structure of another virus file processing device, in accordance with an example of the present disclosure. The virus file processing device may be taken as a client application and used in a UE. In the example, the virus file processing device may include a memory 901, and a processor 902 in communication with the memory 901. The memory 901 may store the following instructions executable by processor 902, a virus file information providing instruction 9012, a cleaning instruction 9013, an isolating instruction 9015 and a transferring instruction 9014.

The virus file information providing instruction 9012 indicates to provide virus file information. The cleaning instruction 9013 indicates to clean virus files in a UE, which correspond to the virus file information, based on the virus file information. The isolating instruction 9015 indicates to provide isolation space, and utilize the isolation space to isolate the virus files. The transferring instruction 9014 indicates to transfer the virus files, which are cleaned based on the cleaning instruction 9013, to the isolation space.

The virus file information providing instruction 9012 may further include a first path setting instruction 90121 and a first scanning instruction 90123 (which are not shown in the figure). The first path setting instruction 90121 indicates to set a first path to be scanned in a UE. The first scanning instruction 90123 indicates to search for virus files in the UE based on the first path, and generate virus file information based on the virus files.

In the example, the memory 901 may further store a first information collecting instruction 9016 executable by processor 902. The first information collecting instruction 9016 indicates to collect the first information of the virus files in the isolation space. The first information refers to information about virus files, which at least includes name and path of a virus file. The first information may further include type of the virus file, and so on. In the foregoing technical solution, since the virus file information of the isolation space has been collected, a corresponding file directory (path) in a UE may be scanned, based on the virus file information. Subsequently, the operations of searching for virus files in a UE may be executed more effectively and more accurately.

Furthermore, the virus file information providing instruction 9012 may further include a first updating instruction 90122 (not shown in the figure). The first updating instruction 90122 indicates to update the first path, based on the first information. The isolating instruction 9015 indicates to remove the virus files in the isolation space, after the first information is obtained, based on the first information collecting instruction 9016.

In addition, to ensure that running of a UE is not influenced by the operations of searching for virus files. In the example, memory 901 may further store a first monitoring instruction 9011 executable by processor 902. The first monitoring instruction 9011 may indicate to monitor whether a UE is idle, and generate a first monitoring result. When the first monitoring result shows that the UE is idle, the first scanning instruction 90123 may further indicate to search for virus files in the UE, based on the first path, and generate the virus file information based on the virus files. The first scanning instruction 90123 may further indicate to scan all of the files in the first path of the UE.

Figure 10:
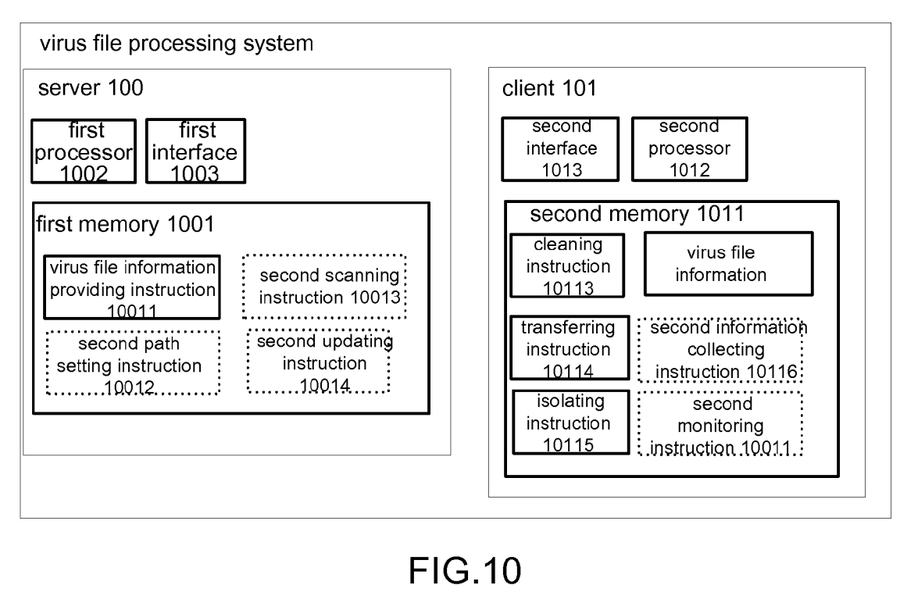
FIG. 10 is a schematic diagram illustrating structure of another system for processing virus files, in accordance with an example of the present disclosure.

FIG. 10 is a schematic diagram illustrating structure of another virus file processing system, in accordance with an example of the present disclosure.

As shown in FIG. 10, the virus file processing system includes a server 100 and a client 101. The server 100 may include a first memory 1001, a first processor 1002 in communication with the first memory 1001, and an interface 1003. The first memory 1001 is to store a virus file information providing instruction 10011 executable by the first processor 1002. The virus file information providing instruction 10011 indicates to search for virus files in a UE, generate virus file information based on the virus files, and transmit the virus file information to client 101 via the interface 1003.

The client 101 may include a second memory 1011, a second processor 1012 in communication with the second memory 1011 and an interface 1013.

The interface 1013 is to receive the virus file information from the server 100, and transmit the received virus file information to the second memory 1011 to be saved.

The second memory 1011 may further store the following instructions executable by the second processor 1012, which include a cleaning instruction 10113, an isolating instruction 10115 and a transferring instruction 10114.

The cleaning instruction 10113 indicates to clean the virus files in a UE, which correspond to the virus file information, based on the virus file information. The isolating instruction 10115 indicates to provide isolation space, and utilize the isolation space to isolate the virus files. The transferring instruction 10114 indicates to transfer the virus files, which are cleaned based on the cleaning instruction 10113, to the isolation space.

Functions of server 100 in FIG. 10 are similar to that of the virus file information providing instruction 9012 in FIG. 9, when is executed by processor 902. The first memory 1001 of server 100 may further store a second path setting instruction 10012 and a second scanning instruction 10013, which are executable by the first processor 1002. The second path setting instruction 10012 indicates to set a second path to be scanned in a UE. The second scanning instruction 10013 indicates to search for virus files in a UE based on the second path, generate virus file information based on the virus files, and transmit the virus file information to client 101 via interface 1003.

Furthermore, the second memory 1011 in client 101 may further store a second information collecting instruction 10116, which is executable by the second processor 1012. The second information collecting instruction 10116 indicates to collect the second information of virus files in the isolation space. The second information refers to information about virus files, which at least includes name and path of a virus file. The second information may further include type of the virus file, and so on.

Furthermore, the first memory 1001 in server 100 may further store a second updating instruction 10014 executable by the first processor 1002. The second updating instruction 10014 indicates to update the second path, based on the second information.

After obtaining the second information based on the second information collecting instruction 10116, the isolating instruction 10115 further indicates to remove the virus files in the isolation space.

In addition, to ensure that running of a UE is not influenced by the operations of searching for virus files, the first memory 1001 in client 100 may further store a second monitoring instruction 10011 executable by the first processor 1002. The second monitoring instruction 10011 may indicate to monitor whether a UE is idle, and generate a second monitoring result. When the second monitoring result shows that the UE is idle, the second scanning instruction 10013 may further indicate to search for virus files in the UE based on the second path, generate virus file information based on the virus files, and transmit the virus file information to client 101 via interface 1003. The second scanning instruction 10013 may further indicate to scan all of the files in the second path of the UE. By employing the foregoing technical solution, computer resources of a UE, which are consumed by the operations of searching for virus files, may be reduced.

In the foregoing examples of the present disclosure, the operations of searching for virus files are targeted and purposeful. The reason is as follows. In the present disclosure, the operations of searching for virus files may be executed, by utilizing collected virus file information. The virus file information may indicate which path (directory) in a UE may hide a virus file, and type of the virus file, and so on. Thus, in the present disclosure, the virus files in a UE may be searched out in a targeted manner, and a risk of the UE being destroyed by virus files may be reduced. In addition, in the present disclosure, since virus file information has been utilized to search for virus files, it is not necessary to full scan a UE. Subsequently, computer resources of a UE, which are occupied and consumed by the operations of searching for virus files, may be reduced. Furthermore, other files may be prevented from being infected by the virus files, after the virus files having been removed. In the present disclosure, since whether a UE is idle may be monitored, the operations of searching for virus files may be flexible. The reason is as follows. In the present disclosure, virus files may be searched for when a UE is idle. The virus files may be not searched for when the UE is busy. Thus, processing of the virus files may be applicable to practical usage conditions of a UE, which may not bring interference to a user, when the user employing the UE.

The invention claimed is:

1. A device for processing a virus file, the device comprising a memory, and a processor in communication with the memory, wherein the memory stores a virus file information providing instruction, a cleaning instruction, an isolating instruction and a transferring instruction, a first information collecting instruction, which are executable by the processor,
   the virus file information providing instruction indicates to provide virus file information, wherein the virus file information at least comprises name and path of a virus file;
   the cleaning instruction indicates to clean a virus file in a User Equipment (UE) corresponding to the virus file information, based on the virus file information;
   the isolating instruction indicates to provide isolation space, and utilize the isolation space to isolate the virus file, and
   the transferring instruction indicates to transfer the virus file, which is cleaned based on the cleaning instruction, to the isolation space;
   the first information collecting instruction indicates to collect first information of the virus file in the isolation space, wherein the first information of the virus file at least comprises name and path of the virus file, and the isolating instruction further indicates to remove the virus file in the isolation space, after the first information has been collected based on the first information collecting instruction;
   the virus file information providing instruction comprises a first path setting instruction, the first path setting instruction indicates to set a first path to be scanned in the UE; and
   the virus file information providing instruction further comprises a first updating instruction, and the first updating instruction indicates to update the first path based on the first information.

2. The device according to claim 1, wherein the virus file information providing instruction further comprises a first scanning instruction,
   the first scanning instruction indicates to search for the virus file in the UE based on the first path, and generate the virus file information based on the virus file.

3. The device according to claim 2, wherein the memory further stores a first monitoring instruction executable by the processor,
   the first monitoring instruction indicates to monitor whether the UE is idle, and generate a first monitoring result;
   when the first monitoring result shows that the UE is idle, the first scanning instruction further indicates to search for the virus file in the UE based on the first path, and generate the virus file information based on the virus file.

4. The device according to claim 3, wherein the first scanning instruction further indicates to scan all of the files in the first path of the UE.

5. A system for processing a virus file, the system comprising a server and a client, wherein the server comprises a first memory, a first processor in communication with the first memory, and a first interface, the first memory stores a virus file information providing instruction executable by the first processor, the virus file information providing instruction indicates to provide virus file information for the client via the first interface,
   wherein the client comprises a second memory, a second processor in communication with the second memory, and a second interface, the second interface is to receive the virus file information from the server, and transmit the received virus file information to the second memory to be stored, wherein the virus file information at least comprises name and path of a virus file
   the second memory further stores a cleaning instruction, an isolating instruction and a transferring instruction, which are executable by the second processor,
   the cleaning instruction indicates to clean a virus file in a User Equipment (UE) corresponding to the virus file information, based on the virus file information;
   the isolating instruction indicates to provide isolation space, and utilize the isolation space to isolate the virus file;
   the transferring instruction indicates to transfer the virus file, which is cleaned based on the cleaning instruction, to the isolation space;
   the second memory in the client further stores a second information collecting instruction executable by the second processor, the second information collecting instruction indicates to collect second information about the virus file in the isolation space, the second information at least comprises name and path of the virus file;
   the isolating instruction further indicates to remove the virus file in the isolation space, after the second information has been obtained based on the second information collecting instruction;
   the first memory in the server may further store a second path setting instruction, which is executable by the first processor, the second path setting instruction indicates to set a second path to be scanned in the UE; and
   the first memory in the server further stores a second updating instruction executable by the first processor, and the second updating instruction indicates to update the second path based on the second information.

6. The system according to claim 5, wherein the virus file information providing instruction further indicates to search for the virus file in the UE, generate the virus file information based on the virus file, and transmit the virus file information to the client via the first interface;
   the first memory in the server may further store a second scanning instruction, which is executable by the first processor,
   the second scanning instruction indicates to search for the virus file in the UE based on the second path, generate the virus file information based on the virus file, and transmit the virus file information to the client via the first interface.

7. The system according to claim 5, wherein the second memory of the client further stores a second monitoring instruction executable by the second processor, and the second monitoring instruction indicates to monitor whether the UE is idle, generate a second monitoring result, and transmit the second monitoring result to the server via the second interface;
   the first memory in the server further stores a second scanning instruction executable by the first processor, when the second monitoring result shows that the UE is idle, the second scanning instruction indicates to search for the virus file in the UE based on the second path, generate the virus file information based on the virus file, and transmit the virus file information to the client via the first interface.

8. The system according to claim 7, wherein the second scanning instruction further indicates to scan all of the files in the second path of the UE.

9. A method for processing a virus file, the method comprising:
providing virus file information, wherein the virus file information at least comprises name and path of a virus file;
based on the virus file information, cleaning the virus file in a User Equipment (UE) corresponding to the virus file information;
providing isolation space and utilizing the isolation space to isolate the virus file, and
transferring the cleaned virus file to the isolation space;
collecting first information of the virus file in the isolation space, wherein the first information at least comprises name and path of the virus file, removing the virus file in the isolation space, after obtaining the first information;
setting a first path to be scanned in the UE, updating the first path based on the first information.

10. The method according to claim 9, further comprising:
searching for the virus file in the UE based on the first path, and generate the virus file information based on the virus file.

11. The method according to claim 10, further comprising:
monitoring whether the UE is idle and generating a first monitoring result;
when the first monitoring result shows that the UE is idle, searching for the virus file in the UE based on the first path, and generating the virus file information based on the virus file.

12. The method according to claim 11, further comprising:
scanning all of the files in the first path of the UE.

* * * * *